United States Patent [19]

Grigsby, Jr. et al.

[11] Patent Number: 5,239,041
[45] Date of Patent: Aug. 24, 1993

[54] HINDERED AMINES TO SLOW DOWN REACTIVITY IN PRODUCING RIM ELASTOMERS

[75] Inventors: Robert A. Grigsby, Jr., Georgetown; Michael Cuscurida, Austin; Robert L. Zimmerman, Austin; George P. Speranza, Austin, all of Tex.

[73] Assignee: Texaco Chemical Company, White Plains, N.Y.

[21] Appl. No.: 865,170

[22] Filed: Apr. 8, 1992

[51] Int. Cl.$^5$ .............................. C08G 18/50
[52] U.S. Cl. ...................... 528/60; 528/61; 528/68; 528/76; 528/77; 264/328.1; 264/328.6; 264/328.8
[58] Field of Search ............ 528/60, 61, 68, 76, 528/77; 264/328.1, 328.6, 328.8

[56] References Cited

U.S. PATENT DOCUMENTS

| | | | |
|---|---|---|---|
| 4,474,901 | 10/1984 | Dominguez | 528/76 |
| 4,806,615 | 2/1989 | Rice et al. | 528/76 |
| 4,816,600 | 3/1989 | Gillis, Jr. | 564/38 |
| 4,849,544 | 7/1989 | Culley et al. | 564/461 |
| 4,868,225 | 9/1989 | Sun | 521/163 |
| 4,902,768 | 2/1990 | Gerkin et al. | 528/76 |
| 5,002,806 | 3/1991 | Chung | 528/77 |

FOREIGN PATENT DOCUMENTS

| | | |
|---|---|---|
| 0297536 | 1/1989 | European Pat. Off. |
| 0298359 | 1/1989 | European Pat. Off. |

OTHER PUBLICATIONS

R. A. Grigsby, Jr., et al., "Modified Polyetheramines in RIM", *Journal of Elastomers and Plastics*, vol. 23, Jan. 1991, pp. 54–65.

*Primary Examiner*—John Kight, III
*Assistant Examiner*—Rabon Sergent
*Attorney, Agent, or Firm*—Jack H. Park; Kenneth R. Priem

[57] ABSTRACT

A process for preparing a polyurea reaction injection molded (RIM) elastomer is described. A hindered polyetherpolyamine is first obtained by reacting a polyol having two or more hydroxyl groups with an effective amount of long chain alkyl epoxide to give an at least partially hindered intermediate having hydroxyl terminations; and then aminating at least one of the hydroxyl terminations on the intermediate to primary amine groups to give an at least partially hindered polyetherpolyamine. The hindered polyetherpolyamine is then reacted with a polyisocyanate in the optional presence of a catalyst to give a polyurea RIM elastomer. The long chain alkyl group provides steric hindrance to the primary aliphatic amine group, which slows down the reactivity of the amine. The slower reactivity of the amine group is useful in RIM and RRIM compositions since it allows for longer shot or flow times, which in turn permit larger parts to be made from existing equipment.

13 Claims, No Drawings

HINDERED AMINES TO SLOW DOWN REACTIVITY IN PRODUCING RIM ELASTOMERS

FIELD OF THE INVENTION

The invention relates to novel hindered amines and methods for making the same, and in one aspect, more particularly relates to using hindered amines for reaction with polyisocyanates to retard reactivity in the production of reaction injection molded (RIM) elastomers.

BACKGROUND OF THE INVENTION

It is well known in the art of producing synthetic resins to react a polyol or a polyamine (or a compound containing both hydroxyl and amine functionalities) with a polyisocyanate in the presence of a catalyst, such as a tertiary amine, a metal catalyst (e.g. tin) or the like to give a cross-linked resin having polyurea groups. The resulting reaction products are known as flexible polyurethane foams, semi-rigid foams, rigid foams or elastomers, spray polyurea and the like. Polyurea reaction injection molded (RIM) materials and reinforced RIM (RRIM) products containing embedded glass, metal or plastic reinforcing fibers may be made by reacting a polyamine and a polyisocyanate in a heated mold under pressure optionally with a catalyst.

A common problem encountered when molds are employed to shape the article made, particularly when RIM systems are used, is having the components react together at a rate appropriate to the filling of the mold. That is, if an automotive body panel is being fabricated, for example, the components should preferably not start reacting together until the entire mold is filled with the mixture. If reaction occurs prematurely, the RIM material will set up or "gel" in part of the mold and prevent the liquid material from filling the mold resulting in an incomplete part. In one aspect of the invention, it is desirable that the system have longer "flow times" or longer time to flow the components into the mold in a mixed state before reaction occurs. At the same time, the reaction should not take too long once begun since it is desirable to cycle parts through the mold at as high a speed as possible to reduce production costs.

Thus, it would be desirable if a RIM system or components therefor could be devised which would delay the reaction of the materials until the mold is completely filled, but which would not otherwise adversely affect the process.

SUMMARY OF THE INVENTION

Accordingly, it is an object of the present invention to provide a hindered polyamine which will retard its reaction with a polyisocyanate to give a RIM composition.

It is another object of the present invention to provide a hindered polyetherpolyamine which will react more slowly with a polyisocyanate during injection in a mold without adversely affecting the other properties of the RIM material or the reaction profile.

Another object of the invention is to provide a hindered polyamine which may find use beyond RIM applications in spray polyurea foams, flexible foams, rigid foams, semi-rigid foams and the like.

In carrying out these and other objects of the invention, there is provided, in one form, a process for preparing a polyurea elastomer. A hindered polyetherpolyamine is first obtained by reacting a polyol having two or more hydroxyl groups with an effective amount of long chain alkyl epoxide to give an at least partially hindered intermediate having hydroxyl terminations; and then aminating at least one of the hydroxyl terminations on the intermediate to primary amine groups to give an at least partially hindered polyetherpolyamine. Then the at least partially hindered polyetherpolyamine is reacted with a polyisocyanate in the presence of heat to give a polyurea elastomer.

DETAILED DESCRIPTION OF THE INVENTION

It has been discovered that the use of polyetherpolyamines which have been hindered by capping the polyol with a long chain alkyl epoxide group prior to amination gives a hindered polyamine. The long chain alkyl group provides steric hindrance to the primary aliphatic amine. The steric hindrance slows down the reactivity of the amine with the polyisocyanate. The slower reactivity of the amine group is useful in RIM or RRIM since it allows for longer shot or flow times prior to reaction within the mold. Longer shot times allows larger parts to be made from existing equipment.

The hindered amines of the present invention may be made according to the following reaction scheme:

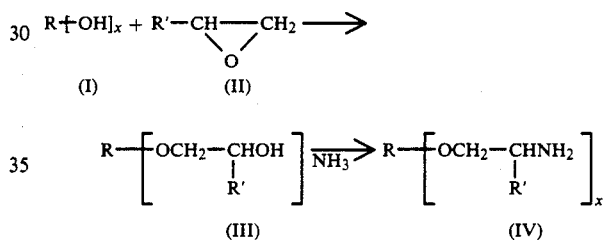

Compound (I) is a polyol and may be any of the commonly used polyols in RIM synthesis, as will be further described below. In a preferred embodiment of the invention, polyol (I) has already been alkoxylated with ethylene oxide, propylene oxide, butylene oxide or mixtures thereof in block or mixed fashion, according to procedures well known in the art. The moiety R represents the initiator center of the polyamine, and may contain the above-described alkoxylation. The initiator center is that left after the reaction of the initiator with the alkylene oxides. The alkoxylated branches of the polyol (I) will terminate in hydroxyl groups. The number of hydroxyl terminations, designated by x should be at least two, preferably from 2 to 8, most preferably from about 2 to about 6.

The long chain alkyl epoxide (II) has a straight or branched alkyl group R' of at least 10 carbon atoms, preferably from about 10 to 20 carbon atoms, most preferably from about 10 to 16 carbon atoms. In one embodiment, at least one mole of long chain alkyl epoxide (II) is reacted per hydroxyl group present on the polyol (I) to give alkoxylated polyol intermediate (III) which is in turn aminated to give the final hindered polyetherpolyamine (IV). In another embodiment, less than all the hydroxyl groups may be reacted with an equivalent of long chain alkyl epoxide.

Somewhat more explicitly, if the prior alkoxylations are represented, the hindered polyetherpolyamine may have the structure (V):

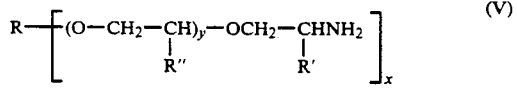

R, R', and x are as defined above, R" is an alkyl group of one or two carbon atoms and y ranges from about 20 to about 80. In the embodiment where less than all the hydroxyl groups are reacted with an equivalent of long chain alkyl epoxide, compounds (IV) and (V) are partially hindered. In this event, at least one of the R' on the resulting molecule is a straight or branched alkyl group of at least 10 carbon atoms, preferably from about 10 to 20 carbon atoms (most preferably 10 to 16 carbon atoms) and the remaining R' groups are hydrogen. In one embodiment, at least half the R' groups are straight or branched alkyl groups of at least 10 carbon atoms.

The capping of the alkoxylated polyol (I) may be achieved at a temperature in the range from about 100° to about 150° C. without a catalyst. A catalyst may be present and is preferably an alkali metal hydroxide. There is often enough catalyst remaining from the alkoxylation reactions to catalyze the capping. While it is contemplated that substantially all of the hydroxyl groups are capped with the long chain alkyl epoxide, it will be appreciated that a smaller percentage of hydroxyl groups may be reacted with the long chain alkyl epoxide to give only a partially hindered polyetherpolyamine, as described above. At least enough hydroxyl groups should be capped to slow down the reactivity of the polyetherpolyamine as compared with the unhindered version of the same amine; this percentage will be called an effective amount herein. In one embodiment of the invention it is preferred that from 20 to 100% of the hydroxyl groups will be capped with the long chain alkyl epoxide, where a preferred range is from about 50 to about 100%. It will be appreciated that the steric hinderance of the R' group next to the primary amine will reduce its activity somewhat. The slower reactivity of the amine group is useful in RIM or RRIM applications since it allows for longer shot times.

The polyhydric alcohols which can be used as initiators for reaction with alkylene oxide, long chain alkyl epoxide and ammonia to provide the hindered polyetherpolyamines of the present invention include, but are not limited to, ethylene glycol; propylene glycols; butylene glycols; pentane diols; bis(4-hydroxycyclohexyl)dimethylmethane; 1,4-dimethylolbenzene; glycerol; 1,2,6-hexanetriol; trimethylolpropane; mannitol; sorbitol; erythritol; pentaerythritol; their dimers, trimers and higher polymers, e.g. polyethylene glycols; polypropylene glycols; triglycerol; dipentaerythritol and the like, polyallyl alcohol, polyhydric thioethers, etc. Meeting the definition of the hindered polyetherpolyamines used in this invention are hindered polyfunctional JEFFAMINE ® amines. JEFFAMINE amines are made by Texaco Chemical Company and they may be modified to hindered versions by capping them with the long chain alkyl epoxide prior to the amination step. JEFFAMINE D-2000 and T-5000 amines are examples of JEFFAMINE amines which may be hindered to provide modified polyetherpolyamines which will give longer flow times when reacted with polyisocyanates. The alkoxylated initiators useful in the process of this invention preferably have a molecular weight of about 2000 or more.

The polyisocyanate used to react with the hindered polyetherpolyamines of this invention may be aromatic or aliphatic polyisocyanates. Typical aromatic polyisocyanates include p-phenylene diisocyanate; polymethylene polyphenylisocyanate; 2,6-toluene diisocyanate; dianisidine diisocyanate; bitolylene diisocyanate; napthalene-1,4-diisocyanate; bis(4-isocyanatophenyl)methane; bis(3-methyl-3-isocyanatophenyl)methane; bis(3-methyl-4-isocyanatophenyl)methane; and 4,4'-diphenylpropane diisocyanate.

Other aromatic polyisocyanates used in the practice of the invention are methylene-bridged polyphenyl polyisocyanate mixtures which have a functionality from about 2 to about 4. These isocyanate compounds are produced by the phosgenation of corresponding methylene bridged polyphenyl polyamines, which are conventionally produced by the reaction of formaldehyde and primary aromatic amines, such as aniline in the presence of hydrochloric acid and/or other acidic catalysts. Known processes for preparing polyamines and corresponding methylene-bridged polyphenyl polyisocyanates therefrom are described in U.S. Pat. Nos. 2,683,730; 2,950,263; 3,012,008; 3,344,162 and 3,362,979, incorporated by reference herein.

Usually methylene-bridged polyphenyl polyisocyanate mixtures contain about 20 to about 100 wt. % methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 wt. % methylene diphenyldiisocyanate isomers, of which 20 to about 95 wt. % thereof is the 4,4'-isomer with the remainder being polymethylene polyphenyl polyisocyanates of higher molecular weight and functionality that have an average functionality of from about 2.1 to about 3.5. These isocyanate mixtures are commercially available and can be prepared by the process described in U.S. Pat. No. 3,362,979 to Floyd E. Bentley, incorporated by reference herein.

The most preferred aromatic polyisocyanate is methylene bis(4-phenylisocyanate) or MDI. Pure MDI, quasi-prepolymers of MDI, modified pure MDI, are all useful in the preparation of RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally, uretonimine modified pure MDI is included also. This product is made by heating pure distilled MDI in the presence of a catalyst to give a mixture of pure MDI and modified MDI. Preferably, the amount of isocyanates used is the stoichiometric amount based on all the ingredients in the formulation or greater than the stoichiometric amount. Examples of commercial materials of this type are Dow Chemical Co.'s Isonate ® 125M (pure MDI) and Isonate ® 143 L (liquid MDI).

Although not essential for the practice of this invention, additives which enhance the color or properties of the polyurea elastomer may be used. For example, chopped or milled glass fibers, chopped or milled carbon fibers and/or other mineral fibers are useful. Additionally, chain extenders such as DETDA may be employed, as well as internal mold release agents, blowing agents, and the like.

The RIM polyurea elastomers of this invention are made in the conventional manner in a mold at a temperature of about 25° to about 225° F. and are then post cured at a temperature of from about 225° to about 400° F. and preferably from about 225° to 350° F. In one embodiment of the invention, the reaction of the hindered polyetherpolyamine with the polyisocyanate is conducted at a temperature in the range from about 25° to about 130° C. and a pressure in the range of from about 0 to about 4000 psi. The equivalents ratio of hindered polyetherpolyamine to polyisocyanate ranges from about 0.05 to about 1.1. It will be appreciated that polyurea elastomers in general may be prepared according to these guidelines and that the polyurea elastomer does not have to be a RIM elastomer made using RIM techniques and equipment.

Another type of additive, which may be required as post curing temperatures approach 400° F. or more, is an antioxidant. The materials which are well known to those skilled in the art as antioxidants include hindered phenols.

Although a catalyst is not required for the production of RIM materials as the hindered polyetherpolyamine will react well with the polyisocyanate in the heated mold, a catalyst may be desired. Such a catalyst may include one or more of the following:

(a) Tertiary amines such as trimethylamine; triethylamine; N-methylmorpholine; N-ethylmorpholine; N,N-dimethylbenzylamine; N,N-dimethylethanolamine; N,N,N',N'-tetramethyl-1,3-butanediamine; N,N-dimethylpiperazine; 1,4-diazobicyclo[2.2.2.]octane and the like;

(b) Tertiary phosphines such as trialkylphosphines; dialkylbenzylphosphines, and the like;

(c) Strong bases such as alkali and alkaline earth metal hydroxides; alkoxides and phenoxides;

(d) Acidic metal salts of strong acids such as ferric chloride; stannic chloride; stannous chloride; antimony trichloride; bismuth nitrate and chloride, and the like;

(e) Chelates of various metals such as those which can be obtained from acetylacetone; benzoylacetone; trifluoroacetyl acetone; ethyl acetoacetate; salicyclaldehyde; cyclopentanone-1-carboxylate; acetylacetoneimine; bis-acetylacetonealkylenediamines; salicyclaldehydeimine, and the like, with various metals such as Be, Mg, Zn, Cd, Pd, Ti, Zr, Sn, As, Bi, Cr, Mo, Mn, Fe, Co and Ni;

(f) Alcoholates and phenolates of various metals such as $Ti(OR)_4$, $Sn(OR)_4$, $Al(OR)_3$ and the like, wherein R in this context is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb and Bi and metal carbonyls of iron and cobalt.

Of course, combinations of any of the above catalysts may be employed. Usually, the amount of catalyst, if employed, ranges from about 0.01 to about 5.0 parts by weight percent based on 100 parts by weight of the polyamine. More often the amount of catalyst used is 0.2 to 2.0 parts by weight.

The preparation of the valuable RIM elastomers is described in the following Examples which are merely illustrative and are not intended to be construed as limiting in any way.

A-Component Preparation

Quasi #1

The preparation of standard quasi #1 was as follows:
PPG-2000 (200 lbs.) was added to a partial drum containing Isonate 143 L (300 lbs.) The contents of the drum were rolled for several hours. After sitting for several days, the product was ready to use.

Quasi #2

The preparation of standard quasi #2 was as follows:
Thanol SF-5505 (200 lbs.) was added to a partial drum containing Isonate 143 L (300 lbs.) The contents of the drum were rolled for several hours. After sitting for several days, the product was ready to use.

Determination of Flow Times

On some of the following examples, a rubber tube flow time was determined on the polyurea RIM system. This test determined flow viscosity more than gel time; however, it should still relate to practical flow characteristics in a mold.

In this test, the mixed A and B components were shot into a latex rubber tubing which had an inside diameter of 3/32" and an outside diameter of 3/8" at room temperature. The tube was connected directly to the nozzle on the head. At a constant throughput of 600 grams/sec., the shot time was adjusted so that the material would flow through the tube without leaving a bulb after all flow stops. If too much material was shot into the tube, solidification at the leading flow front caused the incoming material to leave a bulb near the head. If this occurred, the subsequent shot time was decreased and the process repeated until no bulb was left. The maximum time measured by this test was reported as the rubber tube flow time.

Preparation of Polyurea RIM Elastomers

The following examples illustrate the use of the modified amines to make polyurea RIM elastomers. Examples 1 and 2 illustrate that the modified polyetherpolyamine used in Example 1, is slower than a standard JEFFAMINE amine product, which is used in Example 2. The material in Example 3 was used in a body panel formulation. Example 4 illustrates the use of this material in a fascia formulation. Example 5 was similar to Example 4 except a standard JEFFAMINE amine product was used. Here, even with only about half of the polyetherpolyamine amine groups next to a C16-alkyl group in Example 4, the flow time of this RIM system was longer (0.38 seconds) than the control run (0.36 seconds). Example 6 is another example of an unfilled body panel material using a modified polyetherpolyamine.

EXAMPLE 1

Forty pounds of a formulation consisting of DETDA (13.5 pbw), JEFFAMINE D-2000 (10.0 pbw), Amine C (40.0 pbw), and zinc stearate (1.21 pbw) were charged into the B-component working tank of a Hi-Tech RIM machine. The contents of this tank were heated to 130° F. The A-tank on the RIM machine was charged with quasi #1 and heated to 128° F. The components were pressured up to 2500 psi on the A side and 2500 psi on the B side and injected into a rubber tube to determine the flow time of the material. The measured flow time in the tube was 0.32 seconds. The material was also shot into a flat plaque mold (18"×18"×⅛") which had been preheated to 160° F. The part was removed from the mold in 30 seconds. The resulting elastomer was post cured at 250° F. for one hour. Physical properties of the elastomer are listed in Table I.

EXAMPLE 2

Forty pounds of a formulation consisting of DETDA (13.5 pbw), JEFFAMINE ® D-2000 (10.0 pbw), JEFFAMINE ® T-3000 (40.0 pbw), and zinc stearate (1.21 pbw) were charged into the B-component working tank of a Hi-Tech RIM machine. The contents of this tank were heated to 130° F. The A-tank on the RIM machine was charged with quasi #1 and heated to 128° F. The components were pressured up to 2500 psi on the A side and 2500 psi on the B side and injected into a rubber tube to determine the flow time of the material. The measured flow time in the tube was 0.24 seconds. The material was also shot into a flat plaque mold (18"×18"×⅛") which had been preheated to 160° F. No usable plaque could be made due to the very fast speed of this system. The material would not even fill the mold.

EXAMPLE 3

Forty pounds of a formulation consisting of DETDA (45.0 pbw), Amine C (25.0 pbw), and Amine B (25.0 pbw) were charged into the B-component working tank of an Accuratio RIM machine. The contents of this tank were heated to 115° F. The A-tank on the RIM machine was charged with quasi #2 and heated to 121° F. The components were pressured up to 1950 psi on the A side and 2150 psi on the B side and injected into a flat plaque mold (18"×18"×⅛") which had been preheated to 213° F. The part was removed from the mold in 30 seconds. The resulting elastomer was post cured at 311° F. for thirty minutes. Physical properties of the elastomer are listed in Table I.

EXAMPLE 4

Forty pounds of a formulation consisting of DETDA (13.5 pbw), Amine A (47.77 pbw), and zinc stearate (1.14 pbw) were charged into the B-component working tank of a Hi-Tech RIM machine. The contents of this tank were heated to 125° F. The A-tank on the RIM machine was charged with quasi #1 and heated to 128° F. The components were pressured up to 2900 psi on the A side and 2900 psi on the B side and injected into a flat plaque mold (18"×18"×⅛") which had been preheated to 160° F. The part was removed from the mold in 30 seconds. The resulting elastomer was post cured at 250° F. for one hour. Physical properties of the elastomer are listed in Table I.

EXAMPLE 5

Thirty-five pounds of a formulation consisting of DETDA (45.99 pbw), JEFFAMINE T-5000 (45.99 pbw), and zinc stearate (1.08 pbw) were charged into the B-component working tank of a Hi-Tech RIM machine. The contents of this tank were heated to 137° F. The A-tank on the RIM machine was charged with quasi #1 and heated to 129° F. The components were pressured up to 3000 psi on the A side and 3300 psi on the B side and injected into a flat plaque mold (18"×18"×⅛") which had been preheated to 160° F. The part was removed from the mold in 30 seconds. The resulting elastomer was post cured at 250° F. for one hour. Physical properties of the elastomer are listed in Table I.

EXAMPLE 6

Forty pounds of a formulation consisting of DETDA (38.7 pbw), Amine A (47.77 pbw), and zinc stearate (2.20 pbw) were charged into the B-component working tank of a Hi-Tech-RIM machine. The contents of this tank were heated to 130° F. The A-tank on the RIM machine was charged with quasi #1 and heated to 128° F. The components were pressured up to 2900 psi on the A side and 2900 psi on the B side and injected into a flat plaque mold (18"×18"×⅛") which had been preheated to 230° F. The part was removed from the mold in 30 seconds. The resulting elastomer was post cured at 311° F. for one hour. Physical properties of the elastomer are listed in Table I.

TABLE I

| Physical Properties of the RIM Elastomers | | | | | | |
|---|---|---|---|---|---|---|
| Example | 1 | 2 | 3 | 4 | 5 | 6 |
| Formulation, pbw | | | | | | |
| DETDA | 13.5 | 13.5 | 45.0 | 13.5 | 13.5 | 38.7 |
| JEFFAMINE T-3000 | — | 40.0 | — | — | — | — |
| JEFFAMINE D-2000 | 10.0 | 10.0 | — | — | — | — |
| JEFFAMINE T-5000 | — | — | — | — | 45.99 | — |
| Amine A | — | — | — | 47.77 | — | 47.77 |
| Amine B | — | — | 25.0 | — | — | — |
| Amine C | 40.0 | — | 25.0 | — | — | — |
| Zinc stearate | 1.21 | 1.22 | — | 1.14 | 1.08 | 2.22 |
| Quasi #1 | 56.9 | 56.6 | — | 51.2 | 49.5 | 131.0 |
| Quasi #2 | — | — | 149.3 | — | — | — |
| Properties | | | | | | |
| Shore D | 51/48 | [1] | 75/71 | 46/40 | 44/40 | 63/59 |
| Tensile, psi | 2165 | | 4770 | 2630 | 3440 | 4350 |
| Tear, pli | 324 | | | 390 | 490 | |
| Elongation, % | 89 | | 170 | 220 | 300 | 145 |
| Flexural Modulus | | | | | | |
| 77° F. | 22027 | | 93100 | 24400 | 28400 | 75500 |
| 158° F. | 15183 | | 69300 | 19200 | 22500 | 57400 |
| −20° F. | 66198 | | 132000 | 42500 | 52400 | 98400 |
| 311° F. | | | 52200 | | | |
| Heat sag. 150 mm O.H. | | | | | | |
| 250° F. | 18.3 | | | 20.8 | 21.8 | |
| 311° F. | | | 10.0 | 8.0 | | |
| 350° F. | | | 18.0 | | | 17.5 |
| Rubber tube flow time, seconds | 0.32 | 0.24 | | 0.38 | 0.36 | |

[1] No properties were measured due to the fact that no usable plaques were made.

Amine A (Examples 4 and 6) and Amine C (Examples 1 and 3) were based on trifunctional polyols, whereas Amine B (Example 3) was based on a difunctional polyols. To demonstrate that higher functionality polyols such as four-functional or tetrafunctional polyols may also be employed in this invention, Amines D, E and F were prepared, which are described in the Glossary and used in Examples 7-11.

PREPARATION OF POLYUREA RIM ELASTOMERS: EXAMPLES 7-11

Examples 7 and 8 illustrate the use of these modified polyetherpolyamines. Excellent looking plaques were made with the modified amines. Example 9 is the control experiment in which an unhindered four-functional amine is used to make the RIM plaque. Undesirable pre-gelling is very obvious in this Example. Example 10 is a comparison of a trifunctional amine to the other three Examples. Slightly longer gel times were realized with the modified amines. Example 11 illustrates the use of modified amines in a different formulation such that higher modulus materials are made.

EXAMPLE 7

DETDA (9.04 lbs.) and the four functional amine terminated polyamine Amine D (AMG-C16) (30.96 lbs.) were charged into the B-component working tank of an Accuratio RIM machine. The contents of the tank were heated to 115° F. and the A-tank on the RIM machine was charged with quasi #2 and heated to 116° F. The components were pressured up to 2100 psi on the A side and 1900 psi on the B side and injected into a flat plaque mold (18"×18"×⅛") which had been preheated to 161° F. The part was removed from the mold in 30 seconds. The appearance of the part was excellent. No signs of poor mixing in the plaque could be seen. The resulting elastomer was post cured at 250° F. for one hour. Physical properties of the elastomer are listed in Table II along with the formulation.

EXAMPLE 8

DETDA (9.04 lbs.) and the four functional amine terminated polyamine Amine E (AMG-C10) (30.96 lbs.) were charged into the B-component working tank of an Accuratio RIM machine. The contents of the tank were heated to 120° F. and the A-tank on the RIM machine was charged with quasi #2 and heated to 118° F. The components were pressured up to 2100 psi on the A side and 1950 psi on the B side and injected into a flat plaque mold (18"×18"×⅛") which had been preheated to 161° F. The part was removed from the mold in 30 seconds. The appearance of the part was excellent. No signs of poor mixing in the plaque could be seen. The resulting elastomer was post cured at 250° F. for one hour. Physical properties of the elastomer are listed in Table II along with the formulation.

EXAMPLE 9 (COMPARISON)

DETDA (6.78 lbs.) and a four functional polyetherpolyamine prepared from α-methylglucoside and propylene oxide, Amine F (AMG-C1) (23.22 lbs.) were charged into the B-component working tank of a Hi-Tech RIM machine. The contents of the tank were heated to 130° F. and the A-tank on the RIM machine was charged with the quasi #2 and heated to 130° F. The components were pressured up to 2000 psi on the A side and 2000 psi on the B side and injected into a flat plaque mold (18"×18"×⅛") which had been preheated to 160° F. The part was removed from the mold in 30 seconds. The appearance of the part was very poor. Poor mixing streaks could be seen throughout the part.

EXAMPLE 10 (COMPARISON)

DETDA (9.11 lbs.) and JEFFAMINE T-5000 polyetherpolyamine (30.89 lbs.) were charged into the B-component working tank of an Accuratio RIM machine. The contents of the tank were heated to 118° F. and the A-tank on the RIM machine was charged with quasi #2 and heated to 120° F. The components were pressured up to 2100 psi on the A side and 1900 psi on the B side and injected into a flat plaque mold (18"×18"×⅛") which had been preheated to 160° F. The part was removed from the mold in 30 seconds. The resulting elastomer was post cured at 250° F. for one hour. Physical properties of the elastomer are listed in Table II along with the formulation.

EXAMPLE 11

DETDA (15.3 lbs.) and the four functional amine terminated polyamine Amine D (AMG-C16) (18.84 lbs.) and zinc stearate (0.86 lbs.) were charged into the B-component working tank of a Hi-Tech RIM machine. The contents of the tank were heated to 124° F. and the A-tank on the RIM machine was charged with quasi #1 and heated to 129° F. The components were pressured up to 2200 psi on the A side and 2300 psi on the B side and injected into a flat plaque mold (18"×18"×⅛") which had been preheated to 230° F. The part was removed from the mold in 30 seconds. The resulting elastomer was post cured at 311° F. for thirty minutes. Physical properties of the elastomer are listed in Table II along with the formulation.

TABLE II

| Physical Properties of the RIM Elastomers | | | | | |
|---|---|---|---|---|---|
| Example | 7 | 8 | 9 | 10 | 11 |
| Formulation, pbw | | | | | |
| DETDA | 13.5 | 13.5 | 13.5 | 13.5 | 40.0 |
| Amine D (AMG-C16) | 14.25 | — | — | — | 49.25 |
| Amine E (AMG-C10) | — | 46.25 | — | — | — |
| JEFFAMINE T-5000 | — | — | — | 46.55 | — |
| Amine F (AMG-C1) | — | — | 46.25 | — | — |
| Zinc stearate | — | — | — | — | 2.26 |
| A-Component | | | | | |
| Quasi #1 | — | — | — | — | 134.49 |
| Quasi #2 | 47.97 | 47.95 | 48.5 | 47.93 | — |
| Properties | | | | | |
| Shore D | 64/52 | 60/54 | [1] 58/49 | | 71/66 |
| Tensile, psi | 3320 | 3248 | | 3528 | 4426 |
| Ult. Elongation, % | 230 | 231 | | 245 | 269 |
| Tear, pli | 417 | 463 | | 436 | |
| 100% Modulus | 1840 | 1778 | | 1782 | |
| Flexural Modulus | | | | | |
| −20° F. | 41300 | 42700 | | 44900 | 144500 |
| 77° F. | 29200 | 29000 | | 28600 | 83000 |
| 158° F. | 27700 | 28400 | | 21500 | 64500 |
| Heat sag, 150 mm O.H. | | | | | |
| 250° F. | 20.25 | 14.5 | | 18.5 | |
| 311° F. | | | | | 8.75 |
| 350° F. | | | | | 16.0 |
| Rubber tube flow time, seconds | 0.30 | 0.30 | | 0.24 | |

[1]No properties were measured due to the fact that no usable plaques were made.

Many modifications may be made in the process of this invention without departing from the spirit and scope thereof which are defined only in the appended claims. For example, one skilled in the art may discover that a certain combination or proportion of certain hindered polyetherpolyamines may give advantageous properties, or that certain desirable results are obtained by the use of a hindered polyetherpolyamine with an unhindered polyamine.

| GLOSSARY | |
|---|---|
| DETDA | Diethyltoluene diamine made by Ethyl Corp. |
| JEFFAMINE ® D-2000 | Diamine sold by Texaco Chemical Company of the following structure: $$H_2NCHCH_2-(OCH_2CH)_{33.1}-NH_2$$ with $CH_3$ groups on the CH carbons |
| JEFFAMINE ® T-3000 | Partially aminated polyol having 1.0 meq/g total acetylatables, a total |

GLOSSARY
-continued

| | |
|---|---|
| | amine content of 0.99 meq/g, and a primary amine content of 0.93 meq/g. |
| JEFFAMINE ® T-5000 | Partially aminated polyol having 0.55 meq/g. total acetylatables, a total amine content of 0.48 meq/g. and a primary amine content of 0.43 meq/g. |
| Isonate ® 143L | Liquified diphenylmethane diisocyanate sold by Dow Chemical Co. |
| Modified Polyetherpolyamines: | |
| Amine A | This is a trifunctional polyetherpolyamine in which half of the hydroxyl groups were reacted with a C16 epoxide prior to amination. This material had a total amine value of 0.622 meq/g. |
| Amine B | This material was prepared by capping a 2000 molecular weight polyoxypropylenediol with a C16 epoxide prior to amination. This material had a total amine value of 0.963 meq/g. |
| Amine C | This material was prepared by capping a 3000 molecular weight polyoxypropylene triol with a C16 epoxide prior to amination. This material had a total amine value of 0.975 meq/g. |
| Amine D | This amine was prepared by aminating a polyol prepared from α-methylglucoside and propylene oxide which had been capped off with a C16 prior to amination. Analysis of this material indicated a total acetylatables content of 0.71 meq/g. and a total amine content of 0.568 meq/g. An abbreviation for this amine is AMG-C16. |
| Amine E | This amine was prepared by aminating a polyol prepared from α-methylglucoside and propylene oxide which had been capped off with a C10 prior to amination. Analysis of this material indicated a total acetylatables content of 0.68 meq/g. and a total amine content of 0.567 meq/g. An abbreviation for this amine is AMG-C10. |
| Amine F | This comparative amine was prepared by aminating a four-functional polyol which was prepared from α-methylglucoside and propylene oxide. Analysis of this material indicated a total acetylatables content of 0.72 meq/g. and a total amine content of 0.622 meq/g. An abbreviation for this amine is AMG-C1 |
| PPG-2000 | Polypropylene glycol with an average molecular weight of about 2000. |
| Thanol ® SF-5505 | A 5000 molecular weight high reactivity glycerine-based triol made by ARCO Chemical Co. |
| Zinc Stearate | ED (extra dense) heat stable, sold by Witco Chemical Corp. |

We claim:

1. A process for preparing a polyurea elastomer comprising the steps of:
    obtaining a hindered polyetheramine by the process comprising the steps of:
        reacting a polyol having two or more hydroxyl groups with an effective amount of a long chain alkyl epoxide, where in the long chain alkyl epoxide, the alkyl group has at least ten carbon atoms, to give an at least partially hindered intermediate having hydroxyl terminations; and
        aminating at least one of the hydroxyl terminations on the intermediate using only ammonia to a primary amine group to give an at least partially hindered polyetheramine;
    reacting the at least partially hindered polyetheramine with a polyisocyanate to give a polyurea elastomer.

2. The process of claim 1 where the polyol is reacted with an alkylene oxide selected from the group consisting of ethylene oxide, propylene oxide, butylene oxide and mixtures thereof prior to capping the hydroxyl groups with a long chain alkyl epoxide prior to the aminating step.

3. The process of claim 1 where substantially all of the hydroxyl groups of the polyol are capped with the long chain alkyl epoxide.

4. The process of claim 1 where the hindered polyetheramine has the structure:

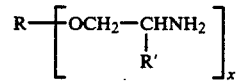

where R is a central moiety from a polyol, at least one R' is a straight or branched alkyl group having at least ten carbon atoms, the balance of R' being hydrogen and x is 2 or more.

5. The process of claim 1 where the equivalents ratio of hindered polyetheramine to polyisocyanate ranges from about 0.05 to about 1.1.

6. The process of claim 1 where the reaction of the hindered polyetheramine with the polyisocyanate is conducted at a temperature in the range from about 25° to about 225° F. and a pressure in the range of from about 0 to about 4000 psi.

7. A process for preparing a polyurea reaction injection molded (RIM) elastomer comprising the steps of:
    obtaining a hindered polyetheramine by the process comprising the steps of:
        reacting a polyol having two or more hydroxyl groups with an effective amount of a long chain alkyl epoxide, where in the long chain alkyl epoxide, the alkyl group has at least ten carbon atoms, to give an at least partially hindered intermediate having hydroxyl terminations; and
        aminating at least one of the hydroxyl terminations on the intermediate using only ammonia to a primary amine group to give an at least partially hindered polyetheramine;
    reacting the at least partially hindered polyetheramine with a polyisocyanate to give a polyurea RIM elastomer at a temperature in the range from about 25° to about 130° F. and a pressure in the range of from about 0 to about 4000 psi.

8. The process of claim 7 where the polyol is reacted with an alkylene oxide selected from the group consisting of ethylene oxide, propylene oxide, butylene oxide and mixtures thereof prior to capping the hydroxyl groups with a long chain alkyl epoxide prior to the aminating step.

9. The process of claim 7 where substantially all of the hydroxyl groups of the polyol are capped with the long chain alkyl epoxide.

10. The process of claim 7 where the hindered polyetheramine has the structure:

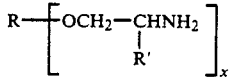

where R is a central moiety from a polyol; at least one R' is a straight or branched alkyl group having at least ten carbon atoms, the balance being hydrogen; and x is 2 or more.

11. A polyurea elastomer made by the process comprising the steps of:
obtaining a hindered polyetheramine by the process comprising the steps of:
reacting a polyol having two or more hydroxyl groups with an effective amount of a long chain alkyl epoxide, where in the long chain alkyl epoxide, the alkyl group has at least ten carbon atoms, to give an at least partially hindered intermediate having hydroxyl terminations; and
aminating at least one of the hydroxyl terminations on the intermediate using only ammonia to a primary amine group to give an at least partially hindered polyetheramine;
reacting the at least partially hindered polyetheramine with a polyisocyanate to give a polyurea elastomer.

12. The polyurea elastomer of claim 11 where the polyol is reacted with an alkylene oxide selected from the group consisting of ethylene oxide, propylene oxide, butylene oxide and mixtures thereof prior to capping the hydroxyl groups with a long chain alkyl epoxide prior to the aminating step.

13. The polyurea elastomer of claim 11 where substantially all of the hydroxyl groups of the polyol are capped with the long chain alkyl epoxide.

* * * * *